United States Patent [19]

Say

[11] 4,259,301

[45] Mar. 31, 1981

[54] REMOVAL OF ACIDIC COMPOUNDS FROM GASEOUS MIXTURES

[75] Inventor: Geoffrey R. Say, Baton Rouge, La.

[73] Assignee: Exxon Research and Engineering Co., Florham Park, N.J.

[21] Appl. No.: 61,663

[22] Filed: Jul. 30, 1979

[51] Int. Cl.³ .............................................. B01D 53/34
[52] U.S. Cl. .................................. 423/228; 423/229; 423/230; 55/68; 55/73; 55/74; 55/96; 252/414
[58] Field of Search .............. 423/210, 220, 230, 223, 423/226, 228, 229; 55/68, 73, 74, 96; 252/411 R, 411 S, 414, 412

[56] References Cited

U.S. PATENT DOCUMENTS

| | | | |
|---|---|---|---|
| 2,608,462 | 8/1952 | Frazler et al. | 423/228 |
| 2,818,323 | 12/1957 | Haensel | 423/230 |
| 3,228,874 | 1/1966 | Morgan | 423/228 X |
| 3,491,031 | 1/1970 | Stoneburner | 423/230 X |
| 3,622,267 | 11/1971 | Bartholome | 423/229 |
| 4,094,957 | 6/1978 | Sartori et al. | 423/223 |
| 4,112,050 | 9/1978 | Sartori et al. | 423/223 |
| 4,112,051 | 9/1978 | Sartori et al. | 423/223 |
| 4,112,052 | 9/1978 | Sartori et al. | 423/228 |

Primary Examiner—Earl C. Thomas
Attorney, Agent, or Firm—Edward H. Mazer

[57] ABSTRACT

A method for removing an acidic component from a gaseous mixture by contacting the gaseous mixture in an absorber with an absorbing solution which removes substantial quantities of the acidic component. The gaseous mixture is then passed through an adsorption zone containing an adsorbent which removes additional quantities of the acidic component. The adsorbent is regenerated by passing regenerating solution through the adsorption zone. In a preferred embodiment, the composition of the regenerating and absorbing solutions are substantially the same and include an amine. This solution may be passed through the adsorption zone to regenerate the adsorbent and then into the absorber to remove acidic components from the gaseous mixture therein.

13 Claims, 3 Drawing Figures

REMOVAL OF ACIDIC COMPOUNDS FROM GASEOUS MIXTURES

BACKGROUND OF THE INVENTION

1. Field of the Invention

This invention relates to a method for removing to relatively low concentration an acid component, such as $H_2S$, from a gaseous mixture. More particularly, the invention is concerned with the selective removal of $H_2S$ from a stream which contains both $H_2S$ and $CO_2$.

2. Description of the Prior Art

In petroleum refining operations, the feedstock may contain sulfur compounds. Prior art methods for removing an acidic component, such as $H_2S$, are well-known and frequently have involved passing the acid-containing gaseous mixture upwardly through an absorber while a solution capable of absorbing significant quantities of the acidic components is passed downwardly. The acid-gas containing solution then is desorbed by passing this solution into a regenerator operated at a lower pressure, where substantial quantities of the acidic components are flashed off and stripped with reboiler steam which flows up the regenerator counter-current to the solution. Certain flow modifications to the regenerator can be made in which a major portion of the solution passed to the regenerator is subsequently removed from an intermediate point on the regenerator while only partially desorbed and is returned to an intermediate point on the absorber. The downwardly flowing absorbing solution passes to the regenerator base and is transferred to a reboiler, where additional quantities of the acidic components are stripped off. This severely stripped or lean solution is recirculated to the top of the absorber where, because of its low absorbed acid concentration, it is capable of removing acidic compounds from the countercurrently flowing gas to relatively low levels. It has been known that amine containing solutions have relatively high acid-absorbing capacities. U.S. Pat. No. 2,818,323 discloses that diethanolamine, dipropylamine, dipropanolamine, butylamine and dibutylamine absorb acid compounds. U.S. Pat. Nos. 4,094,958; 4,112,050; 4,112,051; and 4,112,052 indicate that sterically hindered amines have exceptional acid absorption capacities. U.S. Pat. No. 3,622,267 discloses the use of methyldiethanolamine (MDEA) in the absorbing solution. It has been found that certain amines, such a methyldiethanolamine, selectively absorb $H_2S$ from a gaseous mixture in preference to $CO_2$. The use of selective amines makes it economically attractive in certain instances to recover the sulfur from the $H_2S$. If the acid gas flashed off from the regenerator does not contain excessive amounts of $CO_2$, the acid gas may be directed to a sulfur recovery plant where the $H_2S$ is converted to elemental sulfur.

Utilizing prior art scrubbing systems, when the sulfur concentration in the treated gas exceeds certain predetermined limits, the amount of lean absorbing solution circulated to the top of the absorber can be increased by passing increased quantities of the absorbing solution through the reboiler or for a given lean solution flow rate, the stripping steam rate can be increased. These methods have certain disadvantages. The increase in lean solution and/or steam rate flow increases the reboiler duty, and hence the operating cost. The higher circulation rate of the lean solution results in additional quantities of $CO_2$ being absorbed for certain amines, such as MDEA, resulting in the acid gas stream to the sulfur recovery plant having an increased amount of $CO_2$.

Other gas scrubbing operations have involved dry systems. U.S. Pat. No. 2,818,328 describes a system for removing $H_2S$ from a gaseous mixture by contacting the gas with an adsorptive solid which has been impregnated with an amine. Regeneration is accomplished by heating the particles to volatilize the $H_2S$. This patent does not suggest using a liquid solvent, such as lean absorbing solution, for regeneration, nor does the patent suggest using a conventional liquid scrubbing system upstream of the bed of adsorptive solid. As a result, the beds of adsorptive solid must necessarily be large and the regeneration costs high.

U.S. Pat. No. 3,491,031 is directed at the use of vapor phase impregnation of monoethanolamine (MEA) on activated carbon for the non-selective removal of both $CO_2$ and $H_2S$ from a gaseous mixture. The carbon bed is regenerated by passing MEA vapor through the bed to remove the adsorbed compounds. The excess MEA then preferably is removed by passing an inert gas through the bed. There is no suggestion that the activated carbon bed should be used in conjunction with a conventional liquid scrubbing system, or that the activated carbon could be regenerated by passing a liquid solvent, such as a lean scrubbing solution through the bed. Here, also the activated carbon beds must necessarily be large and the regeneration costs high.

SUMMARY OF THE INVENTION

A process for removing an acidic component from a gaseous mixture which comprises:

A. contacting the gaseous mixture in a contacting zone with an absorbing solution to remove a portion of the acidic component from the gaseous mixture;

B. thereafter passing the gaseous mixture through an adsorption zone containing an adsorbent to remove additional quantities of the acidic component from the gaseous mixture; and C. regenerating the adsorbent by passing a regenerating solution through the adsorption zone.

Preferably, the regenerating solution is an amine-containing solution having the same composition as the absorbing solution, which selectively removes $H_2S$ from gaseous mixtures including $H_2S$ and $CO_2$. When the composition of the regenerating and absorbing solutions are substantially the same, regenerating solution from the adsorption zone may be passed into the contacting zone.

DETAILED DESCRIPTION OF THE INVENTION

Figure 1:
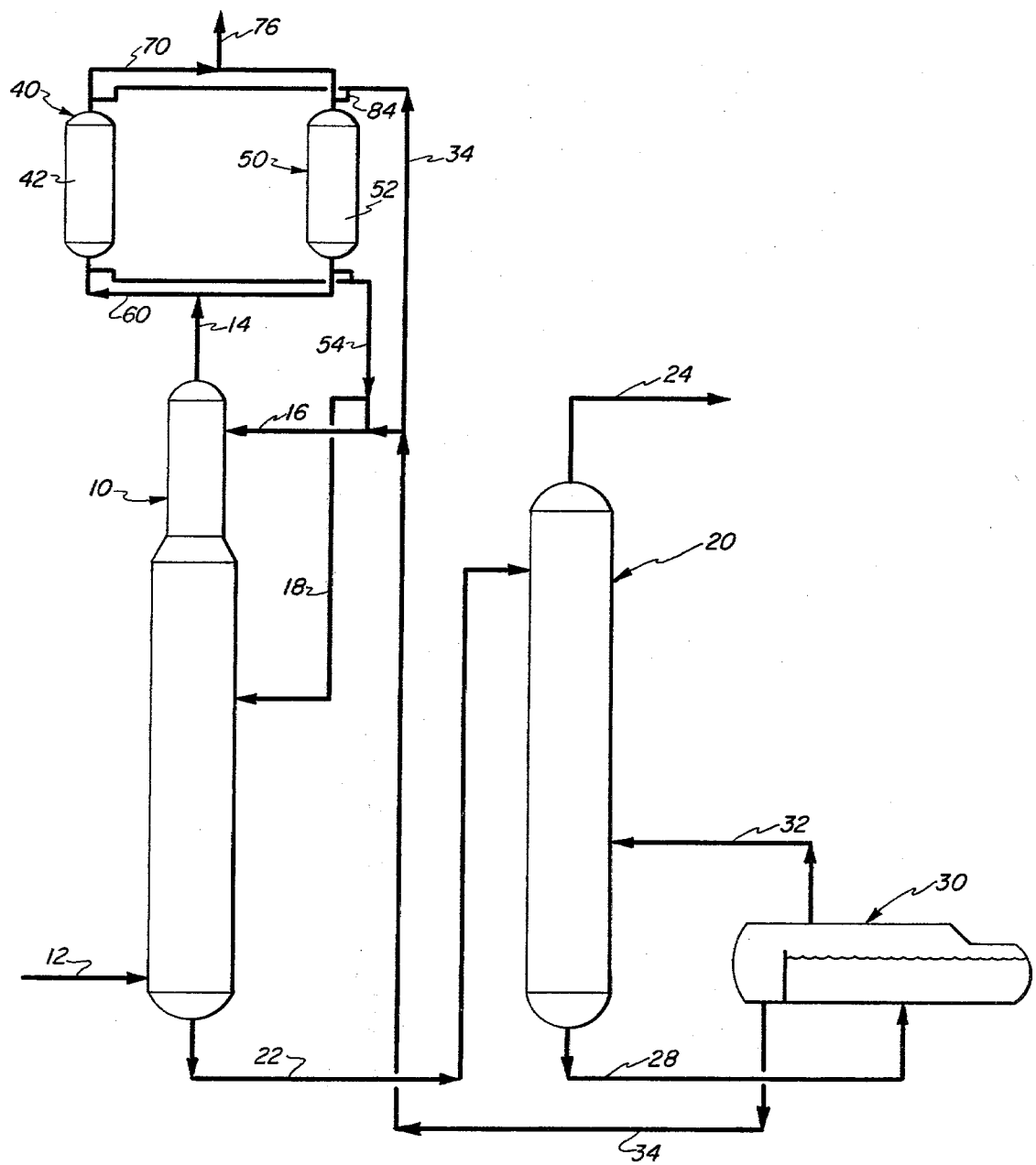
FIG. 1 is a flow diagram of a gas treating process illustrating one embodiment of the subject invention.

Referring to FIG. 1, one embodiment for practicing the subject invention is shown. The gaseous mixture containing acidic components, normally $H_2S$ and $CO_2$, enters the base of a contacting zone, such as absorber 10, through line 12. Absorbers are old and well-known in the art. Absorber 10 should be designed to insure good contact between the gaseous mixture and the absorbing solution. Frequently absorber 10 comprises a tower filled with conventional ceramic packing or a tower having bubble cap plates or sieve plates. Still other absorbers are bubble reactors. The gaseous mixture passes upwardly through absorber 10 and exits through line 14 at the top of the absorber. The treated gas exiting from absorber 10 passes through lines 14 and 60 into an adsorption zone containing an adsorbent, such as a bed of activated carbon or silica gel. Here adsorbent 42 in adsorption zone 40 removes a significant quantity of the remaining $H_2S$ from the gas before the gas exits adsorption zone 40 through lines 70 and 76 for discharge to the atmosphere or for further processing, depending upon its composition. During its upward movement through absorber 10, the gaseous mixture is contacted by countercurrently flowing lean absorbing solution entering the absorber through line 16 located near the top of the absorber. The absorbing solution, which has absorbed a substantial portion of the acidic components from the gas, flows downwardly and passes out of the absorber through line 22. This solution, containing absorbed acidic components, enters a desorption zone, such as regenerator 20 and reboiler 30. Regenerator 20 is generally maintained at a lower pressure than absorber 10. The vaporized acid gas exits regenerator 20 through line 24 for subsequent treatment (not shown). The partially desorbed solution passes downwardly through regenerator 20 and exits through line 28 at the bottom of the regenerator for transfer to reboiler 30. Reboiler 30, equipped with an external source of heat, vaporizes a portion of this solution. The vapor is returned to regenerator 20 through line 32, while the liquid, which has been steam stripped, exits the reboiler through line 34. The steam stripped, or lean solution, may be returned to the top of absorber 10 through lines 34 and 16. Adsorbent 42 may be regenerated by passing a regenerating solution through adsorption zone 40 which is capable of removing the adsorbed acidic components. The regenerating solution preferably comprises an amine, and, in the preferred embodiment described herein, has the same composition as the absorbing solution. In this embodiment, all or part of the lean absorbing solution from reboiler 30 also may be passed through lines 34 and 84 and then through adsorbent 52 contained in adsorption zone 50, to regenerate the adsorbent by removing the acid components adsorbed thereon. After passing through adsorption zone 50, the absorbing solution may pass through lines 54 and 16 into absorber 10 for further absorption. Alternatively, a portion of the absorbing solution may pass through line 18 and enter at a lower point on absorber 10.

In the embodiment shown, adsorption zones 40 and 50 are arranged in parallel, so that one may be regenerated while the other is in service. This concept is old and wellknown in the art. For simplicity, all valves required for alternating the adsorption zones between the service and regeneration cycles have been omitted. The valving arrangements required are well-known in the art and do not form a part of this invention. In this embodiment, zone 40, in the service cycle, is adsorbing acidic components from treated gas exiting absorber 10 through line 14, while zone 50 is in the regeneration cycle, being regenerated by the lean solution. It can be appreciated that in a parallel bed system, zone 50 also could be put into service adsorbing acidic components from the gas and zone 40 could be regenerated by the lean absorbing solution by manipulation of the appropriate valves (not shown).

The absorbing solution may be any solution capable of absorbing substantial quantities of the acidic components in the gas and readily desorbing them in the regenerator. Among the preferred absorbing solutions are the amines with the more preferred solutions including methyldiethanolamine, monoethanolamine, diisopropanolamine, and sterically hindered amines.

When the gas to be treated contains significant quantities of $H_2S$ and it is desired to utilize this $H_2S$ in a sulfur recovery plant for conversion into elemental sulfur, the acid gas stream to the sulfur recovery plant should contain as high an $H_2S$ concentration as possible. Methyldiethanolamine (MDEA) and other tertiary amines have been found to be relatively selective, i.e. they remove significant quantities of $H_2S$ relative to the amount of $CO_2$ removed when considering the amounts present in the feed gas. As may be seen from the following example, the use of an aqueous MDEA absorbing solution in combination with the process of FIG. 1 resulted in a relatively high concentration of $H_2S$ in the acid gas stream to the sulfur recovery plant and a relatively low amount of $H_2S$ exiting from the system in the treated gas.

Typically, the temperature in absorber 10 ranges between 80°–160° F. and the pressure between 15–500 psig. The actual pressure and temperature of absorber 10 will be dependent upon the composition of the absorbing solution utilized. When the absorbing solution comprises an aqueous methyldiethanolamine solution, the temperature in absorber 10 typically ranges between 100°–200° F. and the pressure between about 15–500 psig. When aqueous MDEA is used, the pressure in reboiler 30 is normally within the range of 5–25 psig, preferably 5–10 psig, and the temperature within the range of 230°–260° F., preferably 230°–245° F. Adsorption zone 40 typically will have temperatures and pressures somewhat similar to those of absorber 10 when it is operated in accordance with the embodiment of FIG. 1.

EXAMPLE I

A gas stream containing 60 parts per million by volume (VPPM) of $H_2S$ and 7.0 mole percent of $CO_2$ was passed through a bed comprising 6.7 grams of 6/8 mesh activated carbon operated at ambient temperature and at atmospheric pressure. The activated carbon utilized was Union Carbide type SBV 6/8 activated carbon, an acid washed coconut based material. The type of activated carbon utilized is not believed to be critical. Other types of activated carbon which may be useful are petroleum based carbon and coconut carbon which has not been acid washed. The results are presented in FIG. 2, which is a plot of $H_2S$ concentration in the treated gas as a function of the cumulative standard cubic feet (SCF) of gas treated. The first cycle was performed with fresh activated carbon, the test being terminated when the $H_2S$ concentration in the exit gas reached 45 VPPM. The activated carbon was then regenerated by washing with a fresh 15% by weight aqueous MDEA solution. After this washing, the adsorptive capacity of the activated carbon was almost double that of the fresh activated carbon, as shown by cycle 2 of FIG. 2. The activated carbon retained this increased adsorptive capacity when it was again regenerated with a fresh 15% aqueous MDEA solution, as shown by the adsorptive capacity for cycle 3 of FIG. 2.

The overall process can thereby achieve a very low $H_2S$ concentration in the outlet gas. The activated carbon bed is regenerated without requiring the severe regeneration procedures normally expected. The bed does not have to be dried and does not have to be heated. The regeneration procedure consists of merely washing the bed with a liquid stream of MDEA at the same temperature and pressure that was used for the adsorption cycle. The fresh MDEA solution used could represent makeup MDEA solution being added and could operate only on a portion of the gas leaving the absorber.

EXAMPLE II

Figure 2:
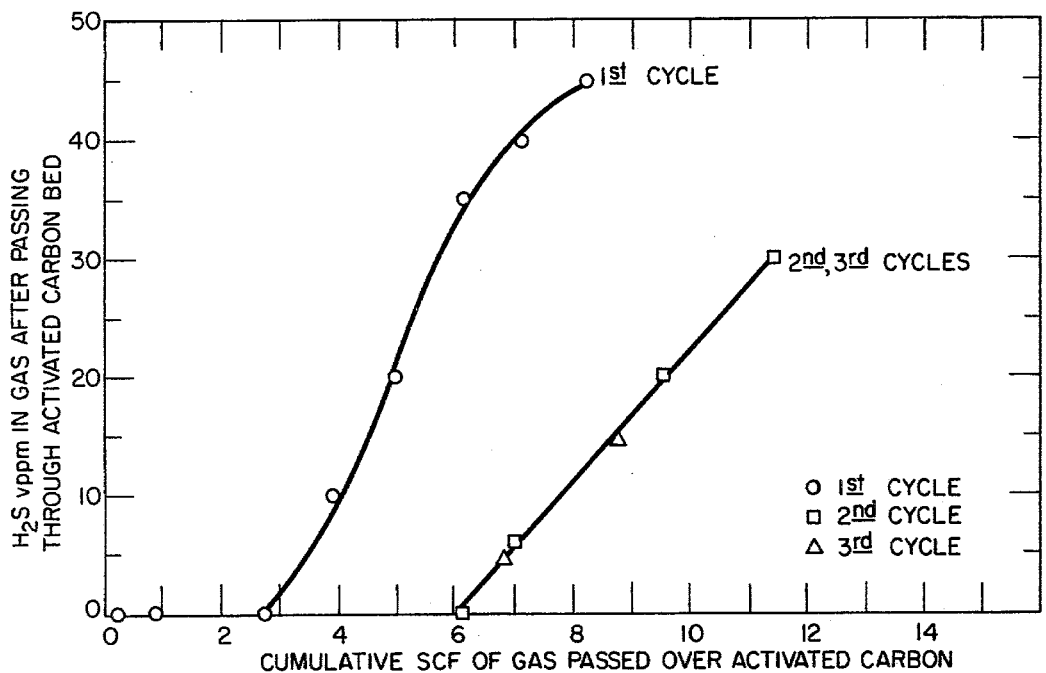
FIG. 2 is a plot of the $H_2S$ concentration in the treated gas as a function of the cumulative standard cubic feet of gas passed over an activated carbon bed for three cycles in which the activated carbon was regenerated with a non-sulfur containing regenerant.
Figure 3:
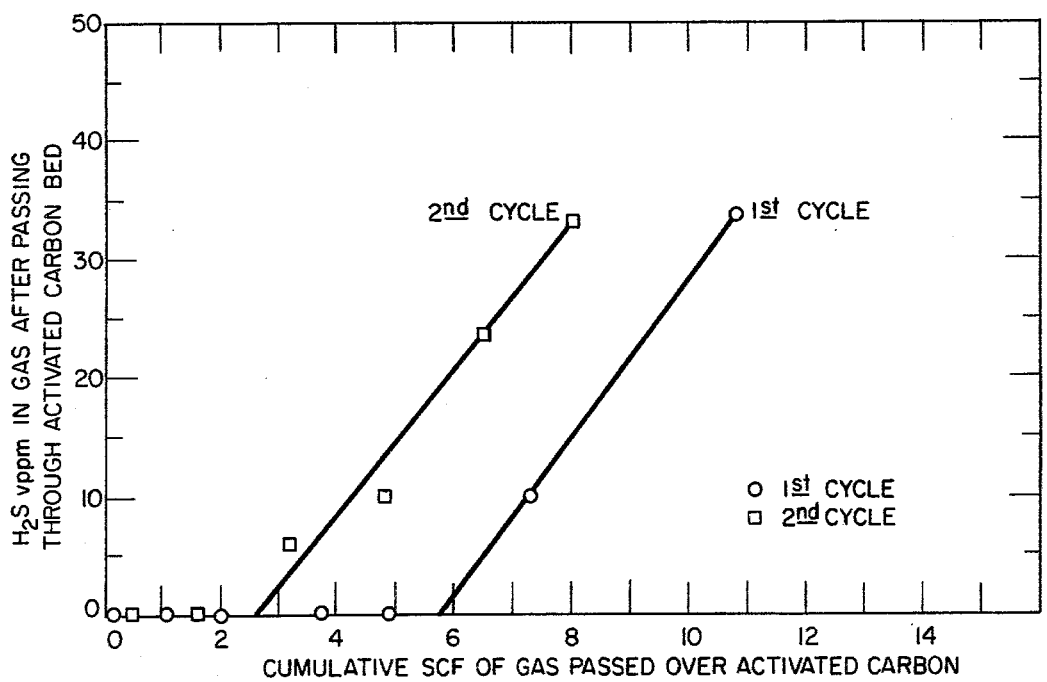
FIG. 3 is a plot similar to that of FIG. 2 in which the activated carbon bed was regenerated with regenerant containing a minor amount of sulfur.

FIG. 3 is a plot similar to that shown in FIG. 2 of the $H_2S$ concentration in the treated gas as a function of cumulative SCF of treated gas for an inlet gas stream containing 60 VPPM $H_2S$ and 7.0 mole percent $CO_2$ passed through a bed comprising 6.7 grams of 6/8 mesh activated carbon at ambient temperature and atmospheric pressure. Here, however, the activated carbon was regenerated before each cycle with a 15 wt. % aqueous MDEA solution containing 0.026 wt. % sulfur. This solution would closely approximate a typical lean absorbing solution. The first cycle after the initial regeneration with the sulfur containing absorbing solution exhibited slightly less $H_2S$ absorption capacity than cycles 2 and 3 of FIG. 2. This is to be expected since the absorbing solution used for regeneration in FIG. 3 contained sulfur. However, the adsorptive capacity of this activated carbon still was superior to that obtained using fresh activated carbon. After another regeneration with the sulfur containing solution, cycle 2 of FIG. 3 exhibited a decrease in adsorption capacity relative to cycle 1. Here again, however, the adsorptive capacity was still higher than that obtained using fresh activated carbon. While the patentability of this invention is not predicated upon any theory, it is believed that the increased adsorption capacity of the activated carbon for $H_2S$ is attributable to amines in the lean absorbing solution becoming adsorbed on the activated carbon. The absorptive capacity of the adsorbed amines for $H_2S$ apparently is greater than the adsorptive capacity of the activated carbon for $H_2S$. As used herein, the term "adsorbed" is defined to include acidic components which are absorbed by the adsorbed absorbing solution as well as acidic components which are directly adsorbed. The amount of $CO_2$ adsorbed by the activated carbon was negligible.

In the regeneration cycle shown in this example, a greatly simplified process is achieved. Adsorbent 52 in zone 50 is regenerated by using the absorbing solution from regenerator 20 which contains some sulfur. This regeneration of the activated carbon is accomplished at the same temperature as the adsorption cycle and without any bed drying required. The adsorbed amine absorbing solution which remains after regeneration can achieve a higher degree of $H_2S$ cleanup than can the same absorbing solution when simply used in absorber 10. The overall adsorption and regeneration of the activated carbon is thereby uniquely integrated into existing gas treating processes and does not require additional energy consumption or additional time consuming drying cycles.

In a typical refining operation, the treated gas exiting absorber 10 through line 14 may have a flow rate of 500,000 SCFH, an $H_2S$ concentration of 60 VPPM and a $CO_2$ concentration of 7 mole percent. Utilizing the subject invention, it is expected that the $H_2S$ concentration exiting through line 76 would have an $H_2S$ concentration of about 0 to 20 VPPM. If a two carbon bed adsorption system were installed and operated in accordance with the teachings of this invention, with each bed alternately used, it is believed that carbon beds 4 feet in diameter and 16 feet high would be satisfactory. Each bed would remain on stream for 8-10 hours between regenerations. The actual size of the adsorption beds would, of course, be dependent on the actual $H_2S$ concentration and the desired on-stream times.

Although the subject process has been described with reference to a specific embodiment, it will be understood that it is capable of further modification. Any variations, uses or adaptations of the invention following, in general, the principles of the invention are intended to be covered, including such departures from the present disclosure as come within known or customary practice in the art to which the invention pertains and as may be applied to the essential features hereinbefore set forth, and as fall within the scope of the invention.

What is claimed is:

1. A process for removing an acidic component selected from the class containing of $H_2S$ and $CO_2$ from a gaseous mixture including the acidic component, the process comprising:
   A. contacting the gaseous mixture with an aqueous amine absorbing solution to thereby remove a portion of the acidic component from the gaseous mixture;
   B. thereafter passing the gaseous mixture through an adsorption zone containing an adsorbent selected from the class consisting of activated carbon and silica gel to adsorb additional quantities of the acidic component from the gaseous mixture; and
   C. periodically regenerating the adsorbent by passing through the adsorption zone a liquid amine regenerating solution to thereby remove the adsorbed acidic component.

2. A process for removing an acidic component selected from the class consisting of $H_2S$ and $CO_2$ from a gaseous mixture including the acidic component, the process comprising:
   A. contacting the gaseous mixture with an aqueous amine absorbing solution in a contacting zone to absorb a portion of the acidic component from the gaseous mixture;
   B. thereafter passing the gaseous mixture through an adsorption zone containing an adsorbent selected from the class consisting of activated carbon and silica gel to adsorb additional quantities of the acidic component from the gaseous mixture; and
   C. periodically regenerating the adsorbent by passing the aqueous amine absorbing solution through the adsorption zone to thereby remove adsorbed acidic components.

3. The process of claim 2 wherein the absorbing solution from the adsorption zone is directed into the contacting zone.

4. The process of claim 3 further comprising a desorption zone, at least a portion of the absorbing solution from the contacting zone passing through the desorption zone to at least partially remove the absorbed acidic component.

5. The process of claim 4 wherein the absorbing solution passed to the adsorption zone is absorbing solution from the desorption zone.

6. The process of claim 5 wherein the absorbing solution comprises an aqueous amine solution.

7. The process of claim 6 wherein the amine in the aqueous amine scrubbing solution is selected from the group consisting of monoethanolamine, diisopropanolamine, methyldiethanolamine and sterically hindered amines.

8. A process for selectively removing $H_2S$ from a gaseous mixture including $H_2S$ and $CO_2$, the process comprising:
   A. contacting the gaseous mixture with an aqueous amine absorbing solution in a contacting zone, the absorbing solution absorbing at least a portion of the $H_2S$ from the gaseous mixture;
   B. thereafter passing the gaseous mixture through an adsorption zone containing an adsorbent selected from the class consisting of activated carbon and silica gel to remove additional quantities of $H_2S$ from the gaseous mixture; and
   C. periodically regenerating the adsorbent in the adsorption zone by passing the absorbing solution through the adsorption zone.

9. The process of claim 8 wherein the absorbing solution, after passing through the adsorption zone, is directed into the contacting zone.

10. The process of claim 9 further comprising a desorption zone, the absorbing solution from the contacting zone passing into the desorption zone to thereby at least partially desorb the absorbed $H_2S$.

11. The process of claim 10 wherein the adsorbent in the adsorption zone is regenerated by passing through the adsorption zone at least partially desorbed absorbing solution.

12. The process of claim 11 wherein the desorbed $H_2S$ from the desorption zone is directed to a sulfur recovery plant for conversion of the $H_2S$ to elemental sulfur.

13. The process of claim 12 wherein the aqueous amine absorbing solution includes methyldiethanolamine.

* * * * *